US00RE41044E

(19) United States
(12) Reissued Patent
Hung

(10) Patent Number: US RE41,044 E
(45) Date of Reissued Patent: Dec. 15, 2009

(54) CONNECTOR CAPABLE OF CONNECTING TO COAXIAL CABLE WITHOUT USING TOOL

(75) Inventor: Chen-Hung Hung, Chia-Yi Hsien (TW)

(73) Assignee: Ezconn Corporation, Taipei (TW)

(21) Appl. No.: 11/392,921

(22) Filed: Mar. 30, 2006

Related U.S. Patent Documents

Reissue of:
(64) Patent No.: 6,776,657
Issued: Aug. 17, 2004
Appl. No.: 10/705,987
Filed: Nov. 13, 2003

(51) Int. Cl.
*H01R 9/05* (2006.01)

(52) U.S. Cl. ..... 439/578; 439/439
(58) Field of Classification Search ..... 439/394, 439/439, 441, 578
See application file for complete search history.

(56) References Cited

U.S. PATENT DOCUMENTS 5,769,662 A * 6/1998 Stabile et al. ..... 439/578
6,425,782 B1 * 7/2002 Holland ..... 439/585
6,575,784 B1 * 6/2003 Yamada ..... 439/578
6,634,906 B1 * 10/2003 Yeh ..... 439/585
6,767,248 B1 * 7/2004 Hung ..... 439/578
6,776,657 B1 * 8/2004 Hung ..... 439/578

* cited by examiner

*Primary Examiner*—Thanh-Tam T Le
(74) *Attorney, Agent, or Firm*—Rosenberg, Klein & Lee

(57) ABSTRACT

Connector connectable to coaxial cable without using tool is disclosed. The connector comprises an outer sleeve including a front inward rim and a staged bore; an inner sleeve including a front flange and a front inward rim; a nut; a cylindrical coupling sleeved on the outer sleeve; and a resilient gripping ring. A rear inward rim of the nut is fitted between the outer sleeve and the flange and is sleeved on the inner sleeve. The rim of the outer sleeve is sleeved on the inner sleeve. The ring is sandwiched between a rear inward rim of the coupling and the inner sleeve. The cable is inserted into the coupling and the ring for fitting the outer insulator in the inner sleeve. The insertion is stopped as the outer insulator of the cable contacts the rim of the inner sleeve. The cable is fastened in the connector by the ring.

4 Claims, 6 Drawing Sheets

CONNECTOR CAPABLE OF CONNECTING TO COAXIAL CABLE WITHOUT USING TOOL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to connectors and more particularly to a connector capable of connecting to a coaxial cable without using a tool (e.g., pliers).

2. Description of Related Art

Connectors for coaxial cable are well known. A conventional F class connector of an electrical device (e.g., TV, radio, or the like) is threadedly coupled to a coaxial cable so that the electrical device is able to receive signals via the cable.

A conventional connector 10 for coaxial cable is shown in FIGS. 1A and 1B. The connector 10 comprises a rear, cylindrical shell 11, an internal sleeve 12 surrounded by the shell 11, and a nut 13 having internal threads coupled to a front end of the sleeve 12 (see FIG. 1A). As shown in FIG. 1B, the connector 10 is coupled at one end of a coaxial cable 15 by inserting the cable 15 through a rear end 14 of the connector 10. Both a central conductor and an internal insulator of the cable 15 are inserted into the sleeve 12. Both a braided outer conductor and a shield of the cable 15 are fitted in a space between the shell 11 and the sleeve 12. Furthermore, the nut 13 is threadedly secured to a mated connector of an electrical device (not shown). Finally, a tool (e.g., pliers) is used to press the shell 11 against the shield of the cable 15 for fastening the connector 10 and the cable 15 together.

However, the prior art suffered from two disadvantages. The first one is an environmental problem. In detail, the shield of the cable made of soft PVC (polyvinyl chloride) is gradually replaced by one made of hard PE (polyethylene) for environmental protection. As such, it is impossible of connecting the hard shield of the cable to the connector by exerting force by the hand. Typically, a tool is used to compress one end of the cable into the connector. Next, as stated above, a pliers is used to press the shell 11 against the shield of the cable 15 for fastening the connector 10 and the cable 15 together. Such process is tedious. The second one is that the braided outer conductor of the cable 15 may be damaged during the coupling process. As such, it may degrade the signal transmission quality. Hence, a need for improvement exists.

SUMMARY OF THE INVENTION

It is an object of the present invention to provide a connector for a coaxial cable including a central conductor, an outer insulator surrounded the central conductor, a braided outer conductor in the form of a cylindrical shell surrounded the outer insulator, and a shield surrounded the outer conductor, the connector comprising an outer sleeve including a front, inwardly extending rim, a front bore section having a first diameter, an intermediate bore section having a second diameter larger than the first diameter for forming a shoulder therebetween, and a rear bore section having a flared opening; an inner sleeve including a front flange, a front, inwardly extending rim flush with the flange, and a rear flared opening; a forward rotatable nut including internal threads for threadedly securing to a mated connector[,] and *including* a rear, inwardly extending rim; a hollow, cylindrical coupling including a rear, inwardly extending rim; and a resilient gripping ring including an annular section and a plurality of oblique teeth equally spaced apart around an inner edge thereof, wherein the rim of the nut is rotatably fitted between the outer sleeve and the flange and is sleeved on an intermediate portion of the inner sleeve, the rim of the outer sleeve is sleeved on the flared opening of the inner sleeve with the shoulder being flush with the flared opening of the inner sleeve, the annular section is sandwiched between the rim of the coupling and the flared opening of the rear bore section, and the coupling is sleeved on a rear portion of the outer sleeve; and a front end of the cable is inserted into the coupling and the ring for snugly fitting the outer insulator in a bore of the inner sleeve, the insertion is stopped as a front end of the outer insulator contacts the rim of the inner sleeve and front ends of the outer conductor and the shield contact both the shoulder and an edge of the flared opening of the inner sleeve, the central conductor is inserted into the mated connector for connection, and the teeth exert an inwardly gripping force onto an outer surface of the shield for fastening the front end of the cable in the connector. By utilizing the present invention, it is possible of connecting the connector to the coaxial cable without using a tool.

In one aspect of the present invention, the flared opening of the inner sleeve comprises a sharp edge capable of inserting through the outer conductor into the shield for further fastening the front end of the cable in the connector.

The above and other objects, features and advantages of the present invention will become apparent from the following detailed description taken with the accompanying drawings.

DETAILED DESCRIPTION OF THE PREFERRED EMBODIMENTS

Figure 1A:
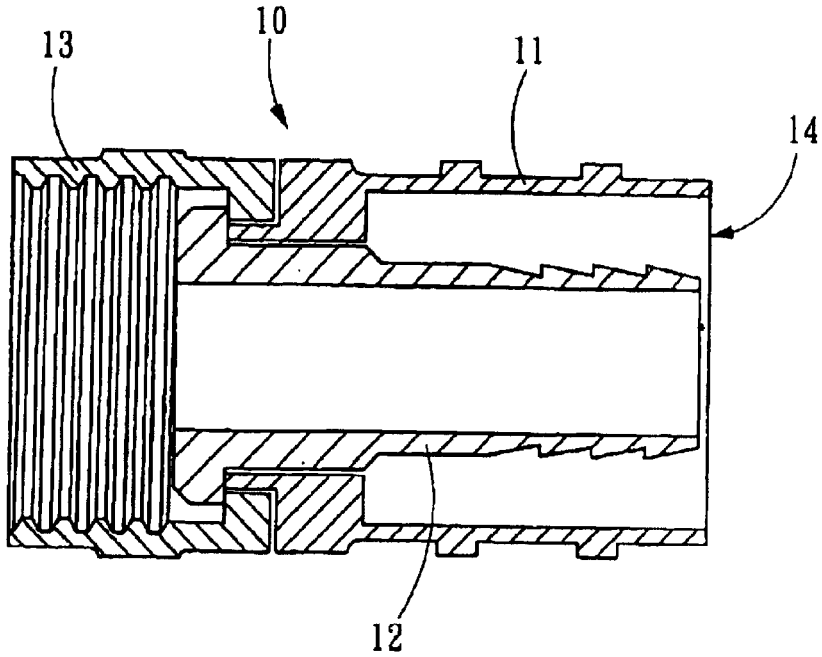
FIG.1A PRIOR ART
FIG. 1A is a cross-sectional view of a conventional connector for coaxial cable.
Figure 1B:
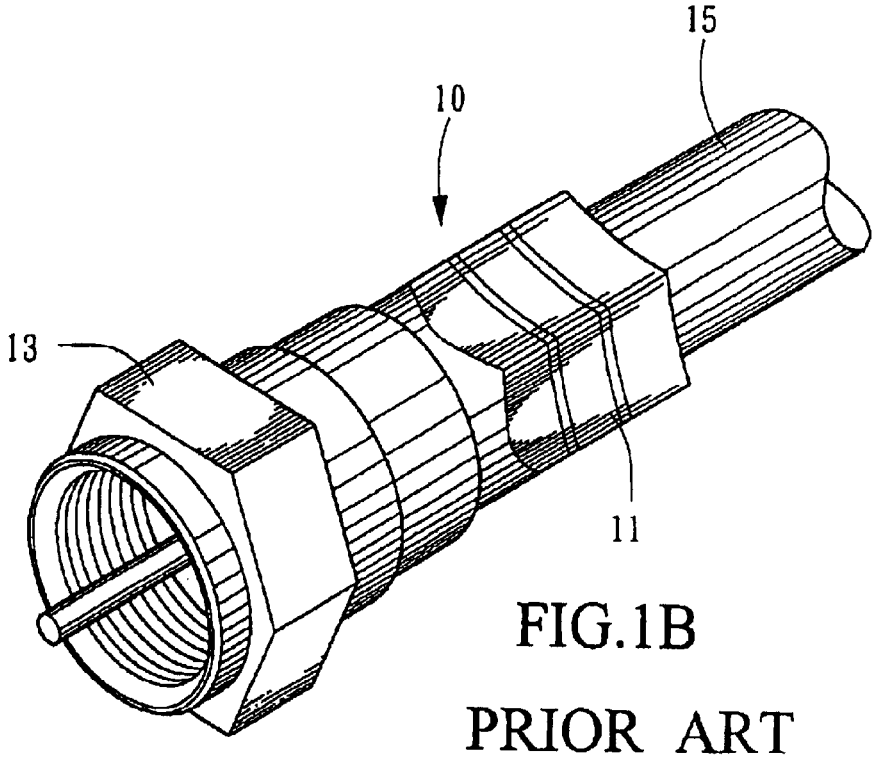
FIG.1B PRIOR ART
FIG. 1B is a perspective view of the connector coupled to one end of the cable.

Referring to FIGS. 2A, 2B, 2C and 8, a connector constructed in accordance with a first preferred embodiment of the invention is shown. The connector comprises a body 20 including an outer sleeve 21, an inner sleeve 30, a forward rotatable nut 40, and a hollow, cylindrical coupling 50, and a resilient gripping ring 60. Each component will be described in detail below.

Figure 3:
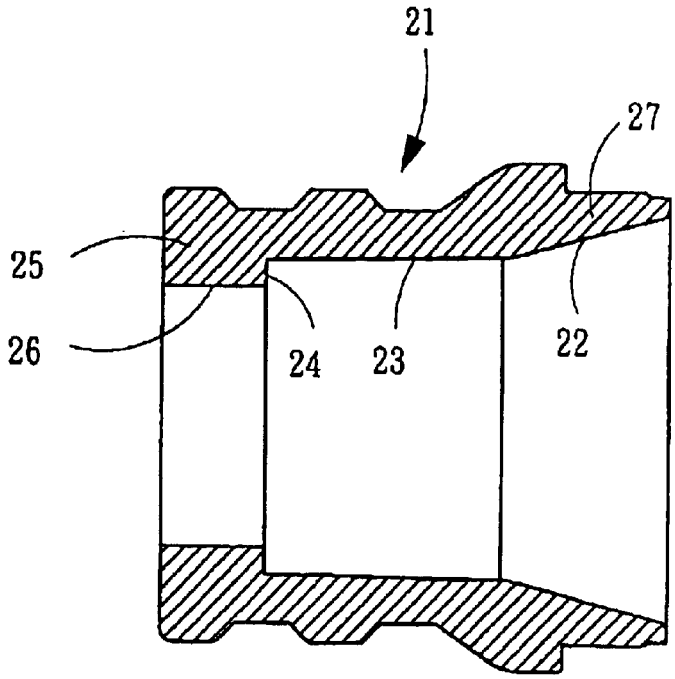
FIG. 3 is a cross-sectional view of the outer sleeve.

Referring to FIG. 3, the outer sleeve 21 comprises a rear portion 27, a front, inwardly extending rim 25, and a bore consisting of a front section 25 for defining an opening 26 therein, an intermediate section 23 having a diameter larger than that of the front section 25 so as to form a shoulder 24 in a junction therebetween, and a rear section 22 having a flared opening.

Figure 4:
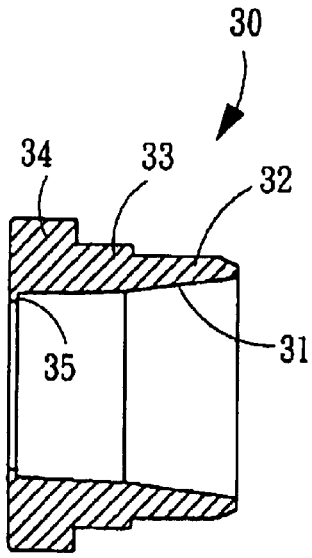
FIG. 4 is a cross-sectional view of the inner sleeve.

Referring to FIG. 4, the inner sleeve 30 comprises a rear section 32, an intermediate section 33, a front flange 34, and a bore having a flared rear opening 31 and a front, inwardly extending rim 35 as a stop.

Figure 5:
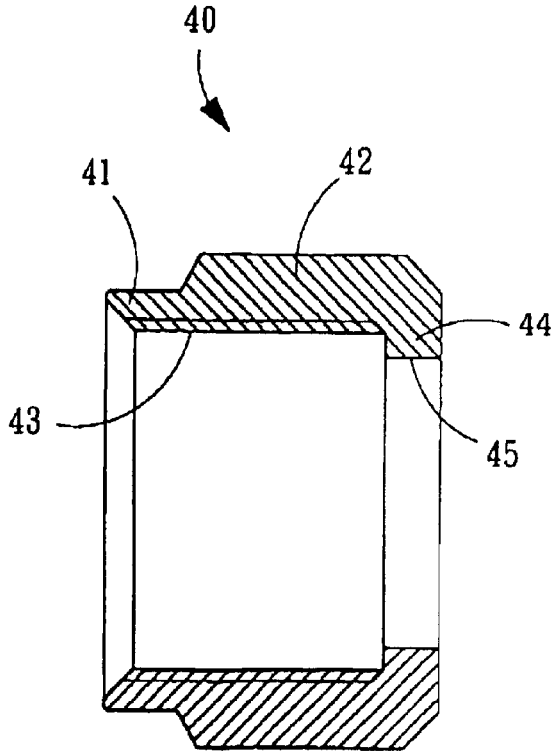
FIG. 5 is a cross-sectional view of the nut.

Referring to FIG. 5, the nut 40 comprises a front end 41, internal threads 43 for threadedly securing to a mated connector of an electrical device, and a hexagonal member 42 having an inwardly extending rim 44 for defining an opening 45 therein.

Figure 6:
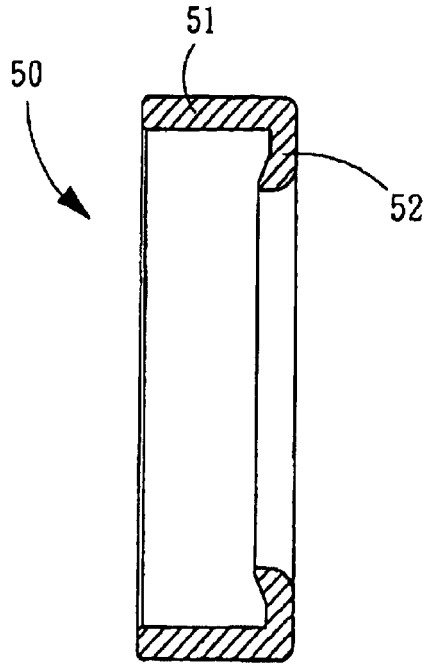
FIG. 6 is a cross-sectional view of the coupling.

Referring to FIG. 6, the coupling 50 comprises a cylindrical portion 51 and a rear, inwardly extending rim 52 having an inwardly bent edge.

Figure 7B:
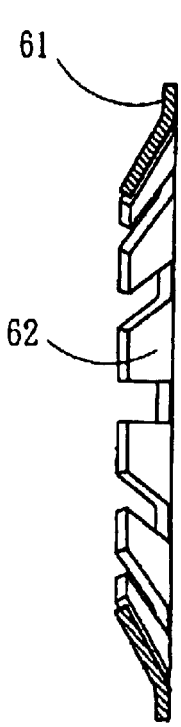
FIG. 7B is a cross-sectional view taken along line 7B—7B of FIG. 7A.
Figure 7A:
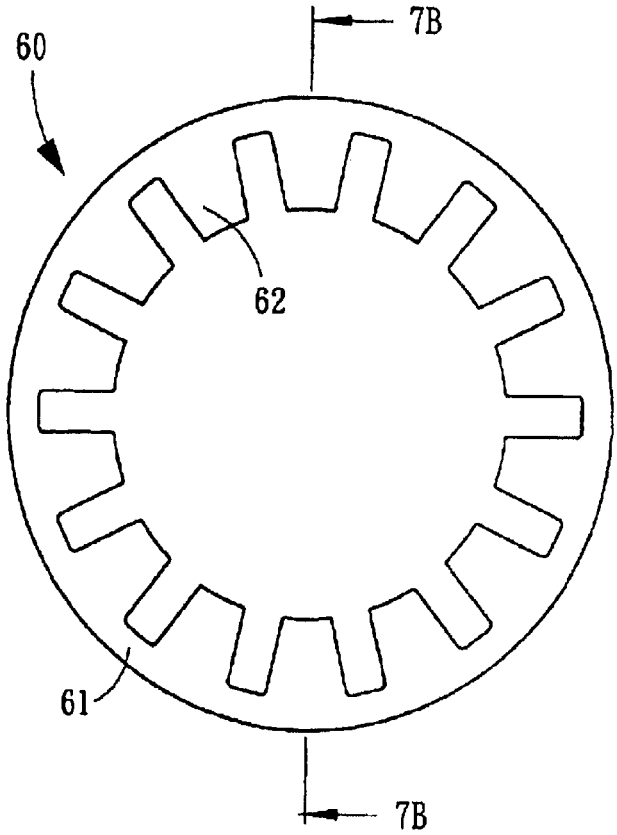
FIG. 7A is a front plan view of the resilient gripping ring.

Referring to FIGS. 7A and 7B, the resilient gripping ring 60 comprises an annular section 61 and a plurality of oblique teeth 62 equally spaced apart around an inner edge thereof.

Figure 8:
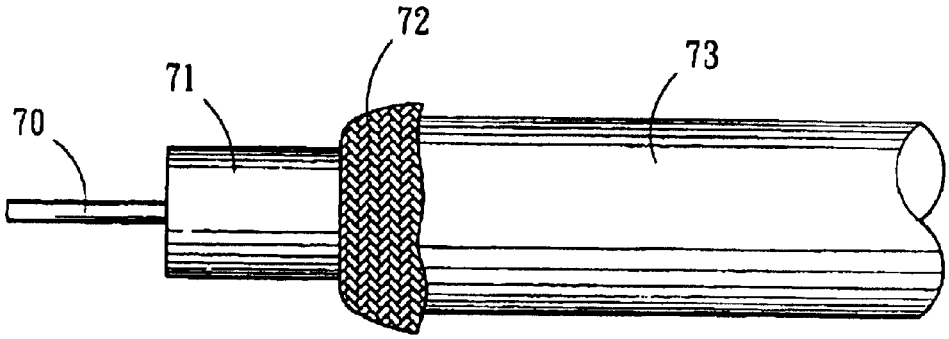
FIG. 8 is a side view of the cable.

Referring to FIG. 8, a coaxial cable comprises a central conductor 70, an outer insulator 71 surrounded the central conductor 70, a braided outer conductor 72 in the form of a cylindrical shell surrounded the outer insulator 71, and a shield 73 surrounded the outer conductor 72. For connecting to the connector of the invention, one ends of the central conductor 70 and the outer insulator 71 are exposed. Also, one end of the outer conductor 72 is exposed and is covered on one end of the shield 73.

Figure 2A:
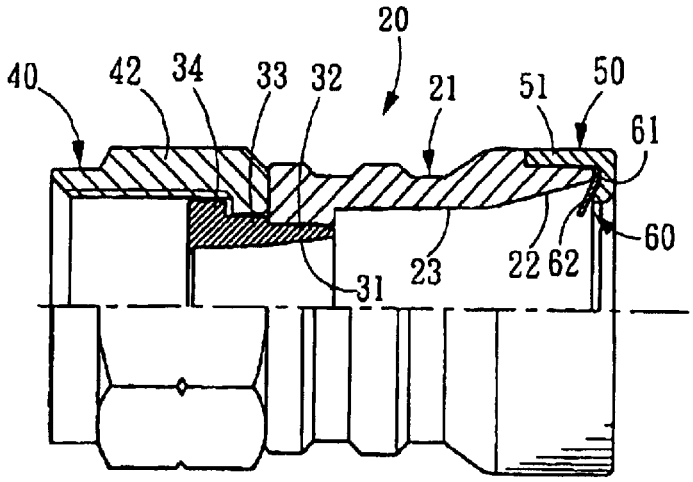
FIGS. 2A, 2B and 2C are partial and full cross-sectional views and side view of a connector according to a first preferred embodiment of the invention respectively.
Figure 2B:
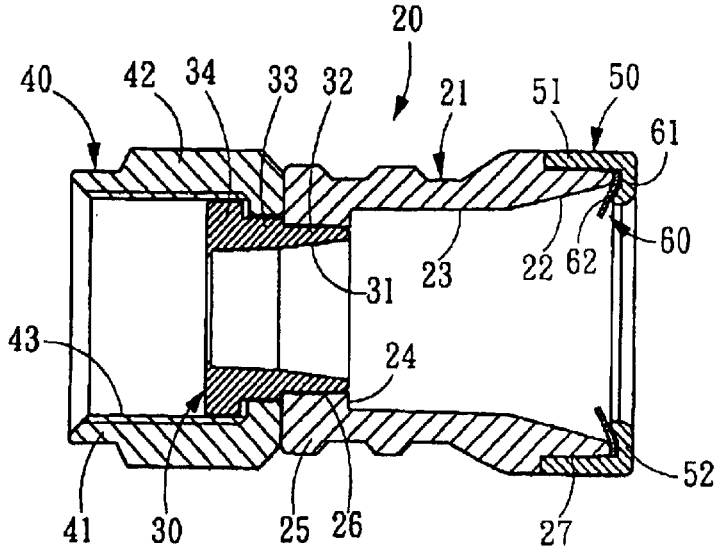
Figure 2C:
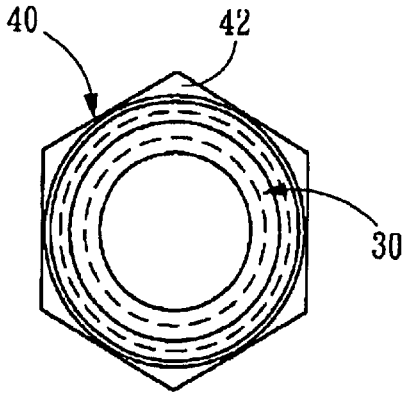
Figure 9:
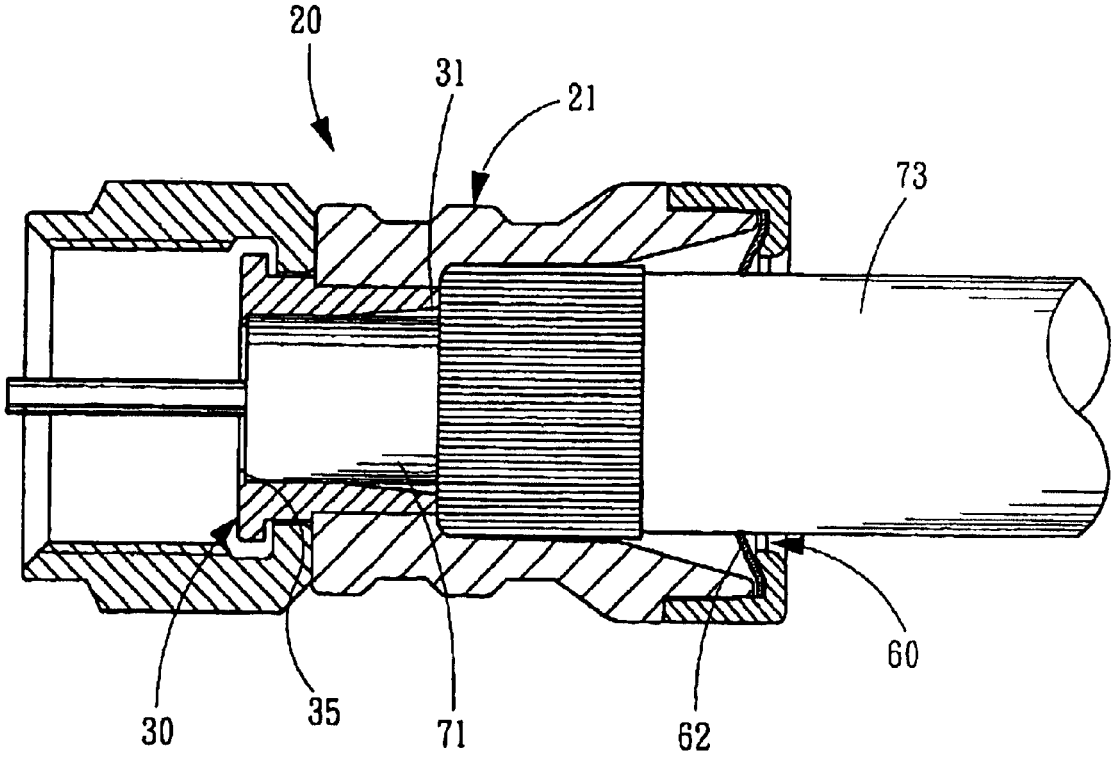
FIG. 9 is a cross-sectional view of the cable coupled to the connector.

Referring to FIG. 9 in conjunction with FIGS. 1 to 8, locations of the components of the connector and the coupling operation of the connector and the cable will now be respectively described in detail below. As shown in FIG. 2B, the rim 44 is rotatably fitted between the front section 25 and the front flange 34 and the rim 44 is disposed around the intermediate section 33. The rim 25 is fitted around the rear section 32 with the shoulder 24 being flush with the rear opening 31. The annular section 61 is sandwiched between the rim 52 and the flared opening of the rear section 22. The cylindrical portion 51 is sleeved on the rear portion 27. As shown in FIG. 9, first insert the front end of the cable into the coupling 50 and the resilient gripping ring 60 for snugly fitting the outer insulator 71 in the bore of the inner sleeve 30. Also, the insertion is stopped as the front end of the outer insulator 71 contacts the rim 35 and the front ends of the outer conductor 72 and the shield 73 contact both the shoulder 24 and the rear opening 31. Further, the central conductor 70 is inserted into a conductive sleeve of a mated connector of an electrical device (not shown) for electrical connection. Moreover, the resilient teeth 62 exert an inwardly gripping force onto the outer surface of the shield 73 for fastening the front end of the cable in the connector.

Figure 10:
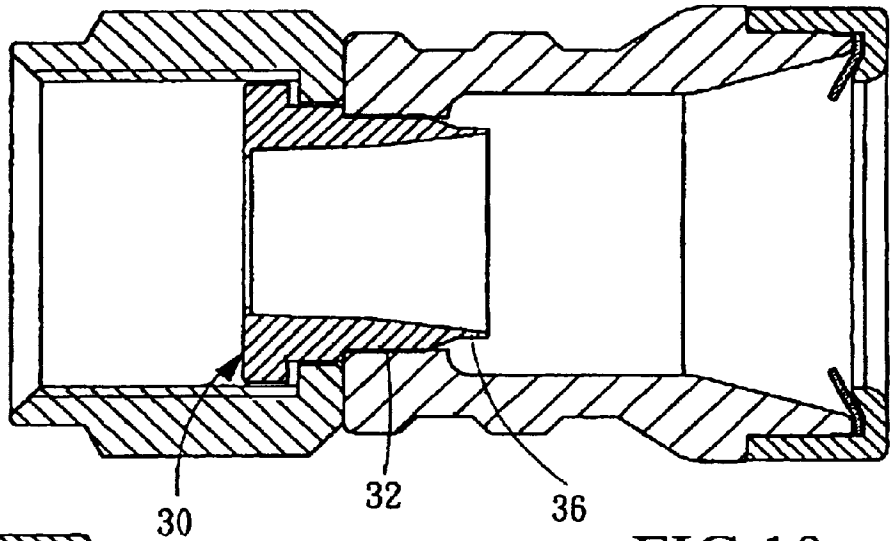
FIG. 10 is a cross-sectional view of a connector according to a second preferred embodiment of the invention.
Figure 11:
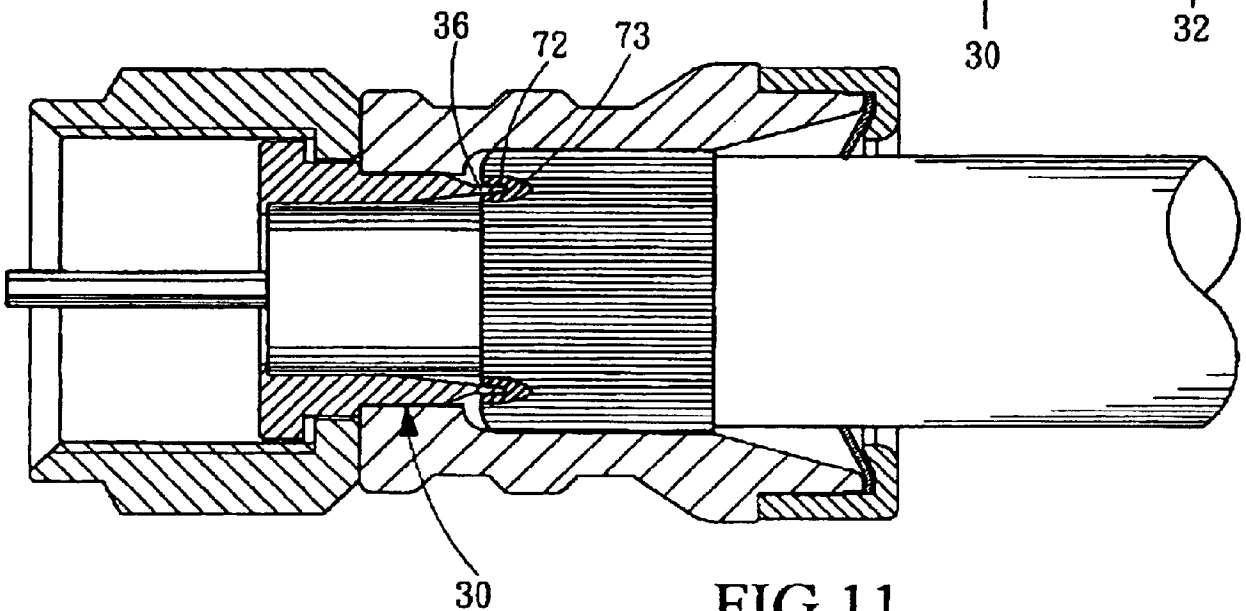
FIG. 11 is a cross-sectional view of the cable coupled to the connector of FIG. 10.

Referring to FIGS. 10 and 11, a second preferred embodiment of the invention is shown. The second preferred embodiment substantially has same structure as the first preferred embodiment. The differences between the first and the second preferred embodiments, i.e., the characteristics of the second preferred embodiment are detailed below. The rear section 32 of the inner sleeve 30 has a sharp edge 36 capable of inserting through the outer conductor 72 into the shield 73 for further fastening the front end of the cable in the connector.

In brief, the connection of the connector and the coaxial cable is done without using a tool. More importantly, the connection is reliable.

While the invention herein disclosed has been described by means of specific embodiments, numerous modifications and variations could be made thereto by those skilled in the art without departing from the scope and spirit of the invention set forth in the claims.

What is claimed is:

1. A connector connectable to a coaxial cable without using a tool, the cable including a central conductor, an outer insulator surrounded the central conductor, a braided outer conductor in the form of a cylindrical shell surrounded the outer insulator, and a shield surrounded the outer conductor, the connector comprising:

an outer sleeve including a front, inwardly extending rim, a front bore section having a first diameter, an intermediate bore section having a second diameter larger than the first diameter for forming a shoulder therebetween, and a rear bore section having a flared opening;

an inner sleeve including a front flange, a front, inwardly extending rim flush with the flange, and a rear flared opening;

a forward [rotatable nut including internal threads] *member* for [threadedly] securing to a mated connector[.] and *including* a rear, inwardly extending rim;

a hollow, cylindrical coupling including a rear, inwardly extending rim; and a resilient gripping ring including an annular section and a plurality of oblique teeth equally spaced apart around an inner edge thereof, wherein the rim of the [nut] *forward member* is [rotatably] fitted between the outer sleeve and the flange and is sleeved on an intermediate portion of the inner sleeve, the rim of the outer sleeve is sleeved on the flared opening of the inner sleeve with the shoulder being flush with the flared opening of the inner sleeve, the annular section is sandwiched between the rim of the coupling and the flared opening of the rear bore section, and the coupling is sleeved on a rear portion of the outer sleeve; and a front end of the cable is inserted into the coupling and the ring for snugly fitting the outer insulator in a bore of the inner sleeve, the insertion is stopped as a front end of the outer insulator contacts the rim of the inner sleeve and front ends of the outer conductor and the shield contact both the shoulder and an edge of the flared opening of the inner sleeve, the central conductor is inserted into the mated connector for connection, and the teeth exert an inwardly gripping force onto an outer surface of the shield for fastening the front end of the cable in the connector.

2. The connector of claim 1, wherein the rim of the coupling comprises an inwardly bent edge.

3. The connector of claim 1, wherein the flared opening of the inner sleeve comprises a sharp edge capable of inserting through the outer conductor into the shield for further fastening the front end of the cable in the connector.

*4. The connector of claim 1, wherein the forward member for securing to a mated connector is a nut having internal threads for threaded engagement to the mated connector.*

* * * * *